(12) United States Patent
Iwasaki et al.

(10) Patent No.: US 10,946,530 B2
(45) Date of Patent: Mar. 16, 2021

(54) END EFFECTOR, ROBOT AND ROBOT SYSTEM

(71) Applicants: KAWASAKI JUKOGYO KABUSHIKI KAISHA, Kobe (JP); MEDICAROID CORPORATION, Kobe (JP)

(72) Inventors: Yukio Iwasaki, Kobe (JP); Satoshi Ouchi, Kobe (JP); Eiji Mitsui, Kobe (JP); Junichi Matsuoka, Kobe (JP); Yukihiko Kitano, Kobe (JP)

(73) Assignees: KAWASAKI JUKOGYO KABUSHIKI KAISHA, Kobe (JP); MEDICAROID CORPORATION, Kobe (JP)

(*) Notice: Subject to any disclaimer, the term of this patent is extended or adjusted under 35 U.S.C. 154(b) by 33 days.

(21) Appl. No.: 16/230,562

(22) Filed: Dec. 21, 2018

(65) Prior Publication Data

US 2019/0193282 A1 Jun. 27, 2019

(30) Foreign Application Priority Data

Dec. 26, 2017 (JP) .............................. JP2017-250236

(51) Int. Cl.
| | |
|---|---|
| B25J 15/00 | (2006.01) |
| B01L 3/02 | (2006.01) |
| B25J 18/00 | (2006.01) |
| B01L 9/00 | (2006.01) |

(52) U.S. Cl.
CPC ............ B25J 15/0019 (2013.01); B01L 3/021 (2013.01); B01L 3/0227 (2013.01); B01L 9/00 (2013.01); B25J 18/007 (2013.01); B01L 3/0275 (2013.01)

(58) Field of Classification Search
CPC ............ G01N 35/1002; G01N 35/0099; B01L 3/0275; B01L 3/021; B01L 3/0227; B01L 9/00; B25J 15/0019; B25J 18/007
See application file for complete search history.

(56) References Cited

U.S. PATENT DOCUMENTS

| | | | | |
|---|---|---|---|---|
| 6,435,582 | B1* | 8/2002 | DaSilva ............... | B25J 15/0052 294/87.1 |
| 7,996,107 | B2* | 8/2011 | Gueller .............. | G01G 13/2851 700/240 |
| 9,517,566 | B2* | 12/2016 | Yeum ..................... | B25J 15/009 |
| 2004/0047765 | A1* | 3/2004 | Gordon ................... | B01L 3/022 422/63 |
| 2011/0089709 | A1* | 4/2011 | Neeper .................... | B25J 9/102 294/119.1 |
| 2014/0039681 | A1* | 2/2014 | Bowling ................ | A61B 34/74 700/261 |

(Continued)

FOREIGN PATENT DOCUMENTS

JP 2010-025953 A 2/2010

*Primary Examiner* — Stephen A Vu
(74) *Attorney, Agent, or Firm* — Oliff PLC

(57) ABSTRACT

There is provided an end effector that is attached to a tip end of a robot arm for providing dispensation using a pipette and a chip attached to the pipette. The pipette includes a press button configured to draw a liquid into the chip or to discharge the liquid drawn into the chip from the chip as the press button is pressed and operated. The end effector includes a holding part for holding the pipette, a motor, and a swing part that presses and operates the press button as the swing part is driven and swung by the motor.

20 Claims, 6 Drawing Sheets

(56) References Cited

U.S. PATENT DOCUMENTS

| | | | |
|---|---|---|---|
| 2016/0041071 A1* | 2/2016 | Bruehwiler | G01N 35/0099 |
| | | | 73/61.59 |
| 2016/0082430 A1* | 3/2016 | Izumo | B01L 3/0217 |
| | | | 422/509 |
| 2016/0341725 A1* | 11/2016 | Hamada | G01N 21/59 |
| 2017/0305017 A1* | 10/2017 | Takebayashi | B25J 15/08 |

* cited by examiner

END EFFECTOR, ROBOT AND ROBOT SYSTEM

BACKGROUND OF THE INVENTION

(1) Field of the Invention

The present invention relates to an end effector, a robot and a robot system.

(2) Description of Related Art

Conventionally, an end effector has been known that is attached to a tip end of a robot arm for providing dispensation. JP 2010-25953 A, for example, proposes a liquid-drop discharge apparatus that can be applied to such an end effector. The liquid-drop discharge apparatus disclosed in JP 2010-25953 A includes a ball screw coupled to a motor, a nut threadedly engaged with the ball screw, a piston coupled to the nut and configured to provide a reciprocating motion within a syringe, a nozzle attached to the syringe, and a liquid surface detection sensor disposed at a tip end of the nozzle.

The liquid-drop discharge apparatus disclosed in JP 2010-25953 A is configured to transmit the driving force of the motor by the ball screw. The liquid-drop discharge apparatus applied to the end effector has an increased number of components and an enlarged dimension of the apparatus as a whole, with an increased production cost. The same thing may hold true for an alternate structure that transmits the driving force of a motor by a rack-and-pinion configuration.

SUMMARY OF THE INVENTION

An object of the present invention is to provide an end effector, a robot and a robot system, which can achieve dispensation with a smaller size of construction and reduced production cost compared to those in the related art.

In order to achieve the object, an end effector according to the present invention is attached to a tip end of a robot arm for providing dispensation using a pipette and a tip attached to the pipette, the pipette including a press button configured to draw a liquid into the tip or to discharge the liquid drawn into the tip from the tip as the press button is pressed and operated, the end effector including a holding part for holding the pipette, a motor, and a swing part that presses and operates the press button as the swing part is driven and swung by the motor.

With this configuration, the end effector includes the swing part that presses and operates the press button as the swing part is driven and swung by the motor. This configuration can provide an end effector that can provide dispensation with a smaller size of construction and reduced production cost compared to that in the related art.

The end effector further includes a first gear attached to a rotation shaft of the motor and a second gear engaging with the first gear, in which the swing part may be attached to the second gear.

With this configuration, the degree of freedom in design can be improved further.

The first gear and the second gear may be spur gears that engage with each other.

With this configuration, the degree of freedom in design can be improved with a simple structure.

The first and second gears may be bevel gears that engage with each other.

With this configuration, the motor can be disposed without any interference with surrounding members.

The swing part may be provided with a roller at a location where the swing part contacts the press button.

With this configuration, both the press button and the swing part can be suppressed from wear.

The roller may be a rubber roller.

With this configuration, both the press button and the swing part can be further suppressed from the wear.

In order to achieve the object, a robot according to the present invention includes a robot arm, the end effector having any one of the configurations described above and attached to the tip end of the robot arm, and a robot controller for controlling the robot arm and the end effector.

With this configuration, the end effector includes the swing part that presses and operates the press button of the pipette as the end effector is driven and swung by the motor. This can provide a robot that can provide dispensation with smaller size of construction and reduced production cost compared to that in the related art.

In order to achieve the object, a robot system according to the present invention includes the robot, a pipette, and a liquid and a container for receiving the liquid.

With this configuration, the end effector includes the swing part that presses and operates the press button as the end effector is driven and swung by the motor. This can provide a robot system that can provide dispensation with a smaller size of construction and a reduced production cost compared to that in the related art.

The object and other objects, features and effects of the present invention will be apparent by the detailed description of preferred embodiments, with reference to the attached drawings.

Figure 1:
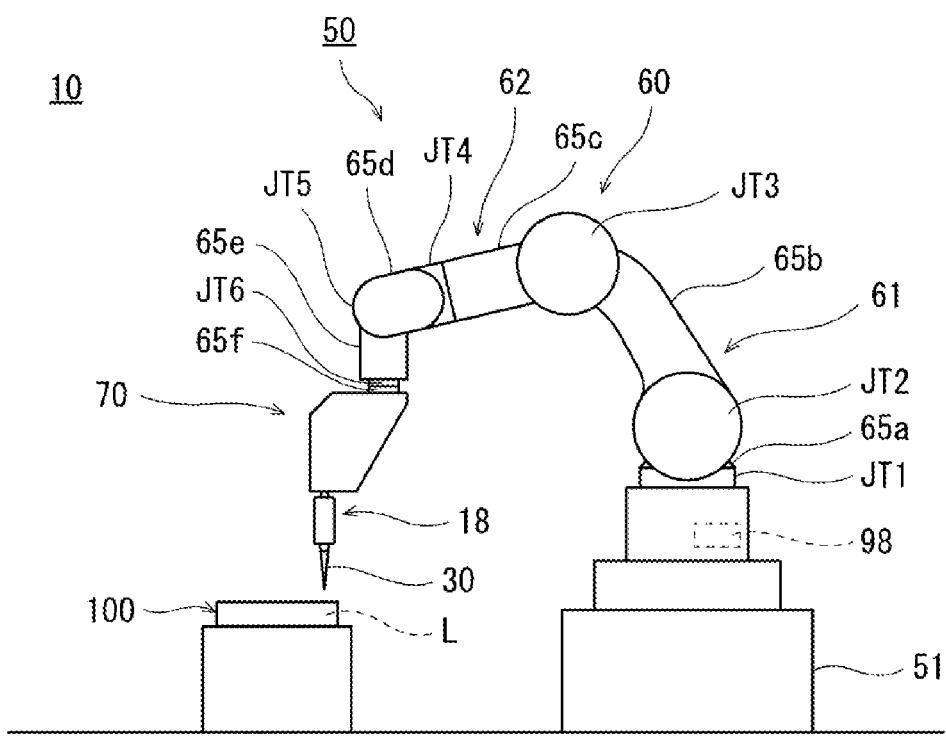
FIG. 1 is a schematic view showing an overall configuration of a robot system including an end effector according to an embodiment of the present invention.

DETAILED DESCRIPTION OF PREFERRED EMBODIMENTS (Overall Configuration)

An end effector according to an embodiment of the present invention will be described below with reference to the drawings. This embodiment is not intended to limit the scope of the present invention. In the following description, same or corresponding elements are provided with same reference numerals and repetitive description or explanation thereof will be omitted.

(Robot System 10)

FIG. 1 is a schematic view showing an overall configuration of a robot system provided with an end effector according to the embodiment. The robot system 10 is used for automated measurement of enzyme-linked immunosorbent assay (ELISA), for example, which has conventionally been operated manually. Generally, the ELISA measurement detects/quantifies antigens that are contained in a sample, as a plurality of reagents and the like are dispensed to induce an antigen-antibody reaction.

As shown in FIG. 1, the robot system 10 includes an eight-channel pipette 18 (multi-channel pipette), a liquid L and a container 100 for receiving the liquid L, and a robot 50.

(Pipette 20)

Figure 2:
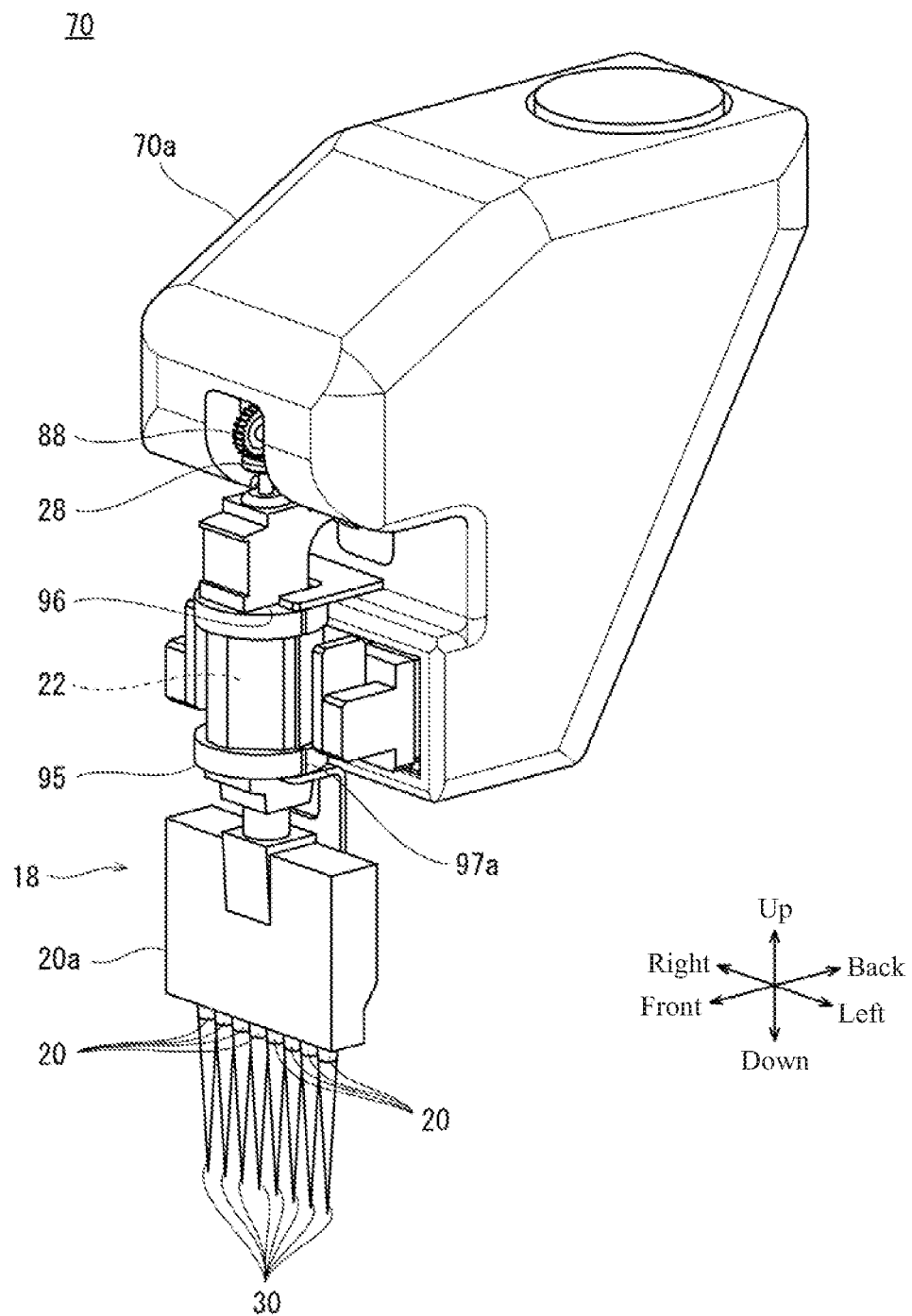
FIG. 2 is an external perspective view showing an end effector holding an eight-channel pipette according to the embodiment of the present invention.

As shown in FIG. 2, the eight-channel pipette 18 includes eight channels (hereinafter referred as "eight pipettes 20" for clarity of description), a pipette enclosure 20a accommodating central portions of the eight pipettes 20, a to-be-held part 22 extending upward from a top surface of the pipette enclosure 20a, and a press button 28 provided to an upper portion of the to-be-held part 22. The eight-channel pipette 18 is configured to draw the liquid L, such as a reagent, into tips 30 mounted to the eight pipettes 20 or to discharge the liquid L drawn into the tips 30, as a swing part 87 of an end effector 70 (describe later) presses and operates the press button 28.

The eight-channel pipette 18 may further include a tip injector (not shown) for removing the tips 30 attached to the pipettes 20, an injector button (not shown) for operating the tip injector, and a capacity setting scale (not shown) for setting the capacity of a liquid to be drawn into the tips 30.

As shown in FIG. 2, the robot system 10 of the embodiment includes at least eight tips 30 that are mounted to the eight-channel pipette 18. The tips 30 of the embodiment each have a tip end, and at least the tip end and a portion adjacent the tip end together form a hollow conical shape having a diameter gradually increasing from the tip end toward the root portion of the tip 30. The tips 30 each have at its root portion an opening into which a tip end of a corresponding pipette 20 is inserted so that the tip 30 is attached to the pipette 20. The attachment of the tips 30 with respect to the pipettes 20 may be achieved automatically in the robot system 10 or may be achieved manually in advance.

(Container 100)

A container 100 in the embodiment is a type (so-called a reservoir) widely used for dispensation and has a good durability against reagents or the like. As shown in FIG. 1, the container 100 includes a bottom plate, side plates extending upward from the rims of the bottom plate, and an opening formed entirely of the top plane of the container 100.

(Liquid L)

A liquid L of the embodiment is a reagent or the like employed in a dispensation process of ELISA measurement that is carried out with the robot system 10.

(Robot 50)

There is provided a robot 50 that includes a platform 51, a robot arm 60 coupled to the platform 51, the end effector 70 attached to a tip end of the robot arm 60, and a robot controller 98 controlling the robot arm 60 and the end effector 70 for operation of the pipettes 20.

(Robot Arm 60)

As shown in FIG. 1, there is provided the robot arm 60 that is a multi-articulated arm including six joints JT1 to JT6 and six links 65a to 65f sequentially joined together with the joints.

The robot arm 60 includes a first arm 61 including a coupling body formed by a link-and-joint construction constituted of a first joint JT1, a first link 65a, a second joint JT2, a second link 65b, a third joint JT3, and a third link 65c. Specifically, the first joint JT1 rotatably couples the platform 51 with a base end of the first link 65a about an axis extending in a vertical direction. The second joint JT2 rotatably couples a tip end of the first link 65a with a base end of the second link 65b about an axis extending in a horizontal direction. The third joint JT3 rotatably couples a tip end of the second link 65b with a base end of the third link 65c about an axis extending in a horizontal direction.

The robot arm 60 includes a second arm 62 including a coupling body formed by a link-and-joint construction constituted of a fourth joint JT4, a fourth link 65d, a fifth joint JT5, a fifth link 65e, a sixth joint JT6, and a sixth link 65f. Specifically, the fourth joint JT4 rotatably couples a tip end of the third link 65c with a base end of the fourth link 65d about an axis extending in a longitudinal direction of the third link 65c. The fifth joint JT5 rotatably couples a tip end of the fourth link 65d with a base end of the fifth link 65e about an axis extending in a direction perpendicular to the longitudinal direction of the fourth link 65d. The sixth joint JT6 torsionally and rotatably couples a tip end of the fifth link 65e with a base end of the sixth link 65f. The end effector 70 is attached to a tip end of the sixth link 65f.

(End Effector 70)

Figure 3:
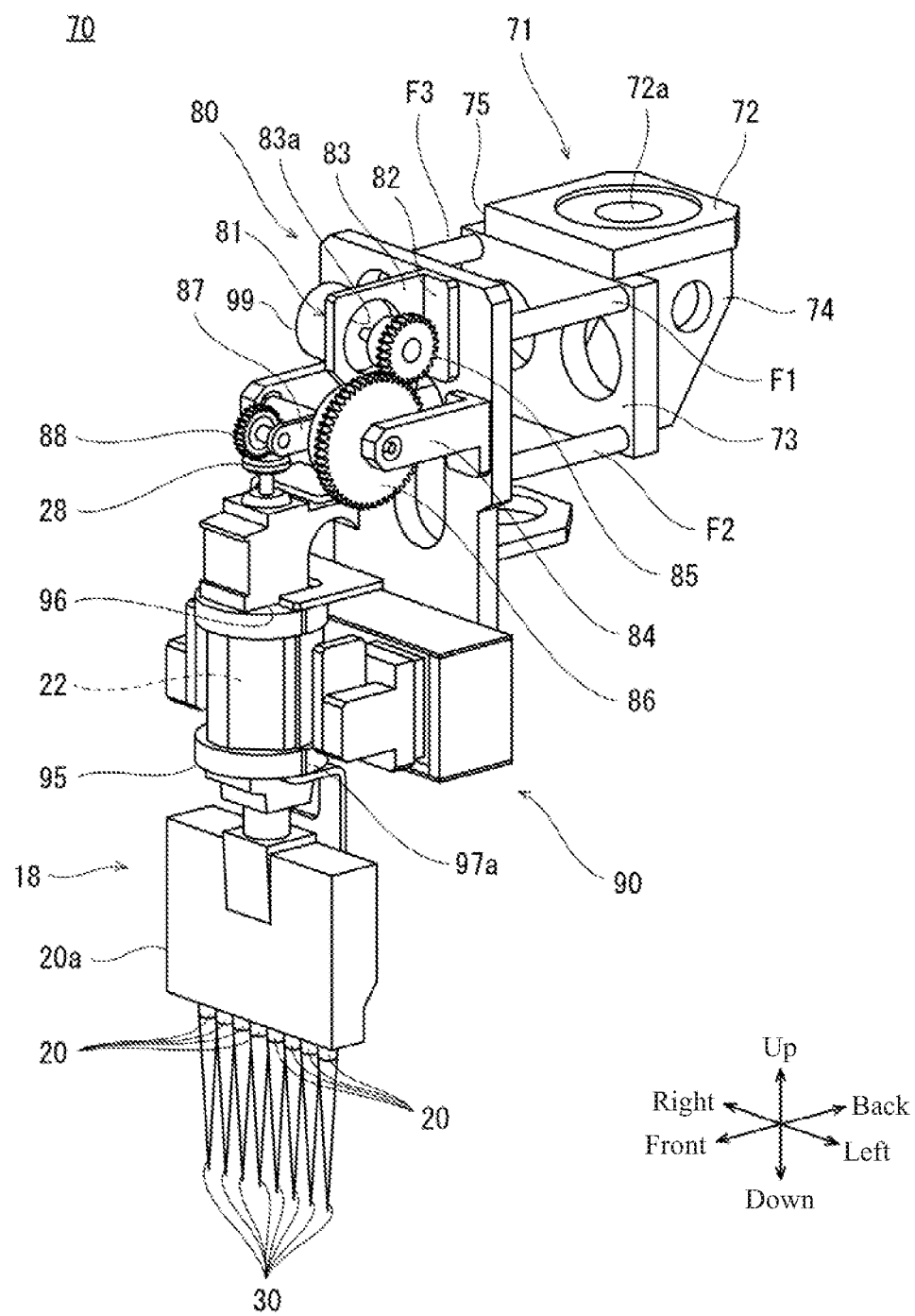
FIG. 3 is a perspective view showing an internal structure of an end effector holding an eight-channel pipette according to the embodiment of the present invention.
Figure 4:
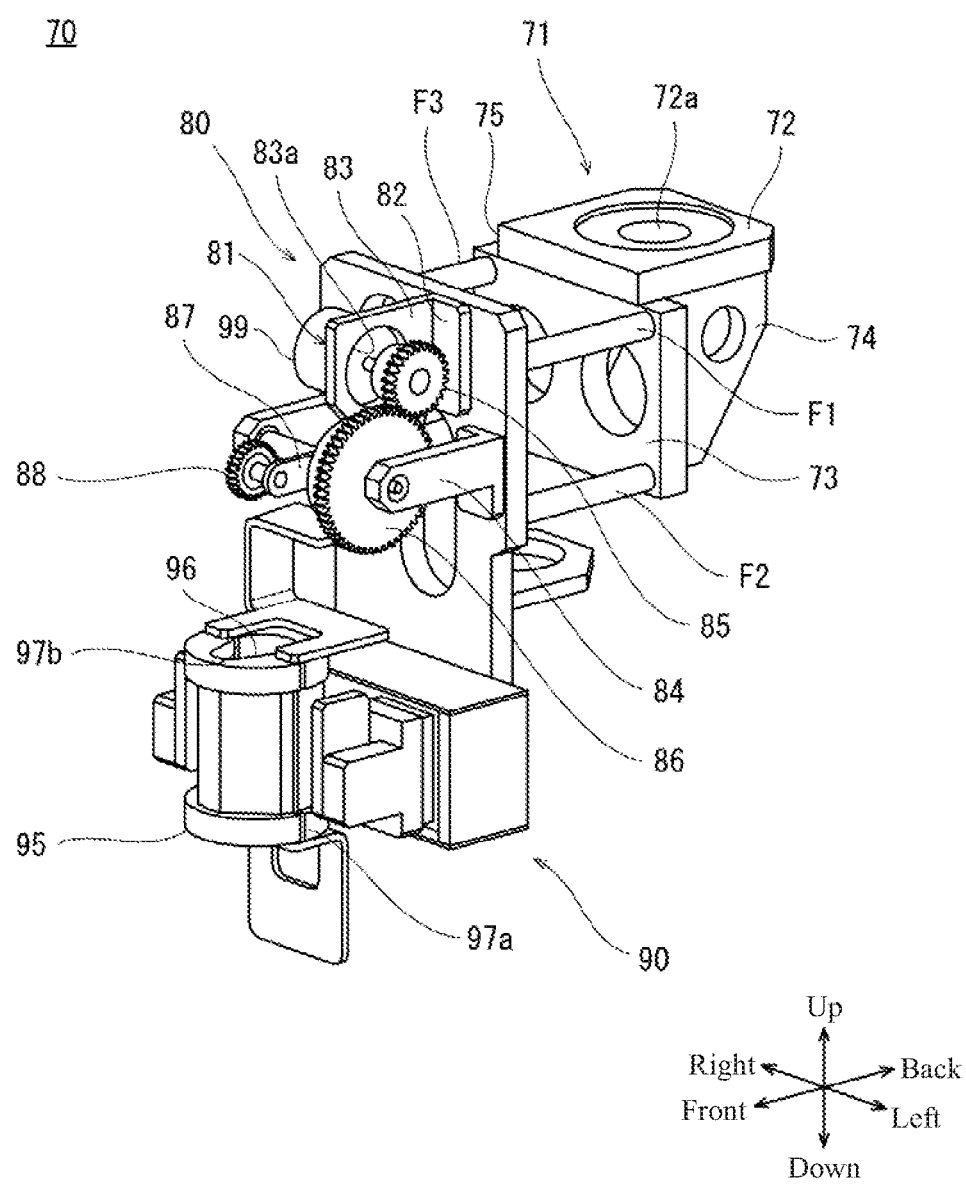
FIG. 4 is a perspective view showing an internal structure of an end effector alone according to the embodiment of the present invention.

With reference to FIGS. 2 to 4, the end effector 70 according to the embodiment of the present invention will be described in detail. FIG. 2 is an external perspective view showing an end effector holding an eight-channel pipette according to the embodiment. FIG. 3 is a perspective view showing an internal structure of the end effector holding an eight-channel pipette. FIG. 4 is a perspective view showing an internal structure of the end effector alone.

As shown in each of the lower right positions of the sheets of FIGS. 2 to 4, the direction along which frames F1 to F4 extend is referred to as a front-and-back direction, and a tip end base 90 is located forward of a root base 71. The axial direction of a cylindrical holding part 95 is referred to as an up-and-down direction and the tip end base 90 is located below the root base 71. In addition, the direction perpendicular to both the up-and-down direction and the front-and-back direction is referred to as a left-and-right direction, and the front side is located at a left side with respect to the rear side in the drawing sheets.

The end effector 70 of the embodiment includes the holding part 95 holding the eight-channel pipette 18, a motor 99, and the swing part 87 that presses and operates the press button 28 of the pipettes 20 as the swing part 87 is driven and swung by the motor 99. The end effector 70 of the embodiment holds the eight pipettes 20 by holding the eight-channel pipette 18. Furthermore, the end effector 70 of the embodiment includes an enclosure 70a for accommodating members such as the swing part 87. As shown in FIG. 2, the holding part 95 is not included inside the enclosure 70a and is provided on a front surface of the enclosure 70a. In FIGS. 3 and 4, configurations besides principle parts of the end effector 70 according to the present invention are omitted as appropriate to avoid complexity of appearance.

The end effector 70 has a framework that includes the root base 71 attached to a tip end of the robot arm 60, a platy central base 80 attached to the root base 71 via the four frames F1 to F4 (only frame F4 is not shown) extending forward from a front surface of the root base 71, and the rectangular parallelepiped tip end base 90 extending forward from a lower end of the central base 80.

The root base 71 includes a root base top plate 72 having an attachment part 72*a* attached to a tip end of the robot arm 60, a root base front plate 73 extending downward from a front rim of the root base top plate 72, a first side plate 74 having a triangular shape and a rear end surface that is inclined so as to extend from a rear end of a bottom surface of the root base top plate 72 to a lower end of a rear surface of the root base front plate 73, on a left side in the side view of the corresponding drawing, and a second side plate 75 opposing the first side plate 74 in the left-and-right direction. The four frames F1 to F4 are provided so as to extend forward from respective locations near the corners of a front surface of the root base front plate 73.

The central base 80 is provided in order to support the motor 99, a first gear 85, a second gear 86, the swing part 87 and a roller 88. A partition plate 81 having an L-shape is secured to an upper end of the central base 80. Specifically, the partition plate 81 includes a partition plate securing part 82 and a partition plate main body 83. The partition plate securing part 82 is secured at its rear surface to a center of an upper end on a front surface of the central base 80 in the left-and-right direction so as to extend in the up-and-down direction. The partition plate main body 83 extends forward from a right side rim of the partition plate securing part 82 in the corresponding drawing. The partition plate main body 83 is provided with a through hole 83*a* passing through the partition plate main body 83 in the left-and-right direction. The central base 80 is provided at a front surface thereof with a second gear supporting member 84 that rotatably supports the second gear 86 to be described later. The second gear supporting member 84 is provided to the front surface of the central base 80 so as to extend forward from a location near a center of the rim in the up-and-down direction on the left side in the corresponding drawing.

The partition plate main body 83 is provided with the motor 99 at a right side of the partition plate main body 83. The end effector 70 of the embodiment further includes the first gear 85 attached to a rotation shaft of the motor 99 and the second gear 86 engaging with the first gear 85. The first gear 85 and the second gear 86 in the embodiment are spur gears, each having an edge surface at left and right sides in the corresponding drawing, the first and second gears 85, 86 engaging with each other. The first gear 85 has a diameter smaller than that of the second gear 86. The first gear 85 is attached to the motor 99 through the through hole 83*a* of the partition plate main body 83. The second gear 86 is rotatably supported at a tip end of the second gear supporting member 84 at a lower front of the first gear 85 so that the second gear 86 engages with the first gear 85.

The swing part 87 is attached to an edge surface of the second gear 86 so as to protrude forward at a right side in the corresponding drawing. The swing part 87 in this embodiment is formed into a substantially platy shape extending in the front-and-back direction and is provided with a main surface at each of left and right directional sides thereof. The swing part 87 is provided with the roller 88 at a location where the swing part 87 contacts the press button 28. In this embodiment, the swing part 87 is rotatably provided at a tip end (or front end) thereof with the roller 88. The roller 88 of the embodiment is a rubber roller having rubber provided on its entire surface with which the press button 28 comes into contact.

The tip end base 90 is provided for supporting the holding part 95 that holds the eight-channel pipette 18. Specifically, the tip end base 90 supports the holding part 95 on a front surface thereof laterally center in the left-and-right direction. The holding part 95 in this embodiment is cylindrical and has a shaft hole 96 passing through the holding part 95 in the up-and-down direction. The holding part 95 is provided with slits 97*a*, 97*b*, one in the left directional side and the other in the right directional side, which run from an outer surface of the holding part 95 into the shaft hole 96 thereof and extend in the up-and-down direction. Each of the slits 97*a*, 97*b* has a width the dimension of which is configured to vary. That is, the holding part 95 receives the to-be-held part 22 of the eight-channel pipette 18 into the shaft hole 96 by increasing the dimension of the widths of the slits 97*a*, 97*b*, and then holds the to-be-held part 22 of the eight-channel pipette 18 by decreasing the dimension of the widths of the slits 97*a*, 97*b*. In this embodiment, a holding operation of the eight-channel pipette 18 with the holding part 95 is achieved in such a manner as described above.

In the end effector 70 of the embodiment including the abovementioned structure, driving force of the motor 99 causes the first gear 85 to rotate, rotation of the first gear 85 causes the second gear 86 engaging with the first gear 85 to rotate, and rotation of the second gear 86 causes the swing part 87 attached to the second gear 86 to swing.

(Robot Controller 98)

The specific configuration of the robot controller 98 may be configured, but not limited, to operate according to a program in which a known processor (such as CPU) is stored in a memory.

(Dispensation Method)

An exemplified dispensation method according to the embodiment, which is accomplished with the robot system 10 described above, will be described.

(First Step)

First, as shown in FIGS. 2 and 3, the pipettes 20 and the tips 30 mounted to the pipettes 20 are held by the holding part 95 of the end effector 70. In this embodiment, the to-be-held part 22 of the eight-channel pipette 18 is held so that the eight pipettes 20 and the tips 30 mounted to the eight pipettes 20 are held by the holding part 95. The first step in the embodiment is carried out in such a manner.

(Second Step)

Then, the pipettes 20 and the tips 30 mounted to the pipettes 20 are moved by the robot arm 60 and the end effector 70, and at least tip ends of the tips 30 mounted to the pipettes 20 are dipped into the liquid L. In this embodiment, at least tip ends of the tips 30 mounted to the respective eight pipettes 20, provided to the eight-channel pipette 18, are dipped into the liquid L. The at least tip ends of the tips 30 can be dipped into the liquid L by, for example, making the tip ends of the tips 30 contact or nearly contact a bottom plate of the container 100 receiving the liquid L. This allows reliably a dipping operation of the tip ends of the tips 30 into the liquid L despite a variation of the height of the surface of the liquid L within the container 100. The second step in the embodiment is carried out in such a manner.

(Third Step)

Finally, the swing part 87 is driven by the motor 99 and the press button 28 of the pipettes 20 is pressed and operated by the swing part 87. Specifically, the first gear 85 attached to the motor 99 is rotated by the motor 99 being turned on, the second gear 86 engaging with the first gear 85 is rotated as the first gear 85 rotates, and the swing part 87 attached to the second gear 86 is swung as the second gear 86 rotates. The swing part 87 is driven in such a manner and the roller 88 provided to the swing part 87 presses and operates the press button 28 of the pipettes 20. With this operation, the liquid L such as a reagent is drawn into the tips 30 mounted to the eight pipettes 20 or the liquid L drawn into the tips 30 is discharged from the tips 30. The third step in the embodiment is carried out in such a manner.

(Effects)

The end effector 70 according to the embodiment includes the swing part 87 that is driven and swung by the motor 99 and presses and operates the press button 28 of the pipettes 20. This structure successfully reduces a number of components and a collective dimension of the device compared to a conventional structure in which a ball screw or the like is used to transmit the driving force of a motor 99, and also reduces a production cost of the device. Consequently, the end effector 70 of the embodiment allows a dispensation operation with a device having a reduced size in structure and a reduced cost in production compared to that in the related art.

In addition, the end effector 70 of the embodiment further includes the first gear 85 attached to a rotation shaft of the motor 99 and the second gear 86 engaging with the first gear 85. The end effector 70 also includes the swing part 87 that swings in cooperation with the rotation of the first gear 85. Under such structure, the position of the swing part 87 can be adjusted by changing the size of the diameter of each of the first and second gears 85, 86. In addition, the first and second gears 85, 86 can be functioned as a deceleration mechanism by an arrangement in which the diameter of the second gear 86 is set greater than that of the first gear 85. Accordingly, the end effector 70 of the embodiment including the first and second gears 85, 86 can be provided with an improved degree of freedom in design.

Furthermore, the first gear 85 and the second gear 86 in this embodiment are spur gears that engage with each other, whereby the end effector 70 of the embodiment can be provided with a simple structure and an improved degree of freedom.

In addition, the swing part 87 in the embodiment includes the roller 88 at a location where the swing part 87 contacts the press button 28. With such an arrangement, when the swing part 87 pushes and operates the press button 28, the roller 88 is caused to rotate and contact the press button 28, which can suppress the wear of both the press button 28 and the swing part 87.

Moreover, the roller 88 in this embodiment is a rubber roller. This arrangement can further suppress the wear of the press button 28 and the swing part 87.

The effects of the robot 50 and the robot system 10 according to the embodiment are the same as those of the end effector, whereby the descriptions thereof are not repeated.

Modified Example

The present invention can easily be modified and embodied by a person skilled in the art by following the above description. Therefore, the above description should be understood merely as an example and is provided to teach a person skilled in the art to implement the present invention with the best mode. Therefore, the detailed description of the structure and/or the function of the present invention can be substantially modified without departing from the spirit of the present invention.

In the embodiment described above, the end effector 70 includes the first gear 85 attached to the rotation shaft of the motor 99 and the second gear 86 engaging with the first gear 85; however, the configuration of the present invention is not limited to this. For example, the end effector 70 may include the swing part 87 that is directly attached to the motor 99, while the first and second gears 85, 86 being excluded. This arrangement can provide an end effector 70 with a further simplified configuration. Alternatively, the end effector 70 may include three or more gears including the first and second gears 85, 86 and the driving force of the motor 99 can be transmitted through the three or more gears. Such an arrangement can provide an end effector 70 with a further improved degree of freedom in design.

Figure 5:
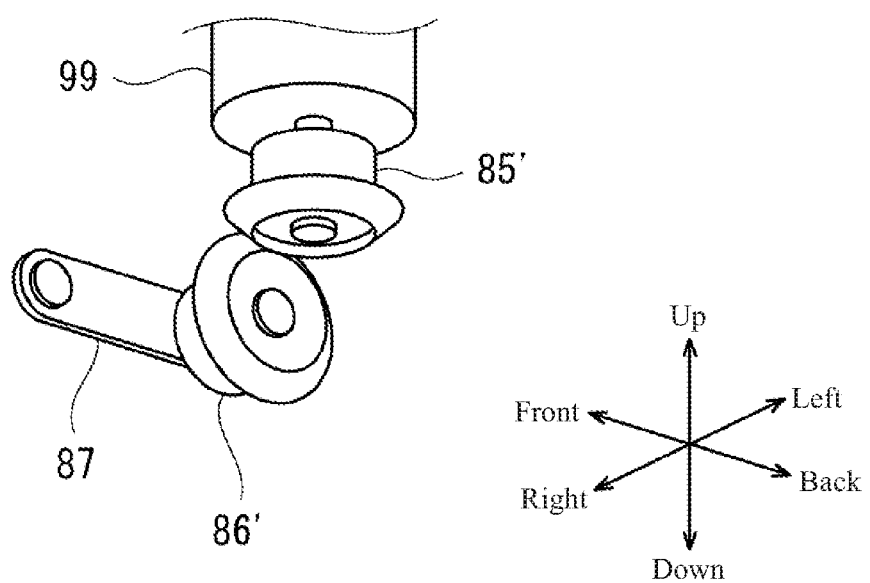
FIG. 5 is an exterior perspective view showing an engagement between a first gear and a second gear according to a modified example of the present invention.

In the embodiment described above, the first gear 85 and the second gear 86 are spur gears that engage with each other; however, the gears are not limited to this. For example, as shown in FIG. 5, the first and second gears 85, 86 may be bevel gears engaging with each other. FIG. 5 shows an external perspective view of a first gear and a second gear, engaging with each other, in a modified example. In this exemplified arrangement, a first gear 85' is positioned so as to extend in the up-and-down direction and a second gear 86' is positioned so as to extend below the first gear 85' toward the right side in the drawing sheet, with both gears being engaged with each other. With this arrangement, the motor 99 can be positioned at a location that can avoid any interference with members around the motor.

In the embodiment described above, the swing part 87 is provided with the roller 88 at a location where the swing part 87 contacts the press button 28, so that the wear of the swing part 87 and the press button 28 is suppressed; however, the configuration of the present invention is not limited to this. For example, the wear of the swing part 87 and the press button 28 can be suppressed with an elastic member provided to the swing part 87 at a location where the swing part 87 contacts the press button 28. Alternatively, no members may be provided to the swing part 87 at a location where the swing part 87 contacts the press button 28 so that the swing part 87 can directly contact and operate the press button 28. This arrangement can provide a device with a further simplified configuration.

In the embodiment described above, the roller 88 is a rubber roller; however, the configuration of the present invention is not limited to this and allows other rollers that can suppress the wear of the swing part 87 and the press button 28.

In the embodiment described above, the swing part 87 has a substantially platy shape having main surfaces at left and right directional sides, respectively, and having a dimension extending in the longitudinal direction; however, the configuration of the present invention is not limited to this. For example, the swing part 87 may be a cylindrical bar-shaped member.

Figure 6:
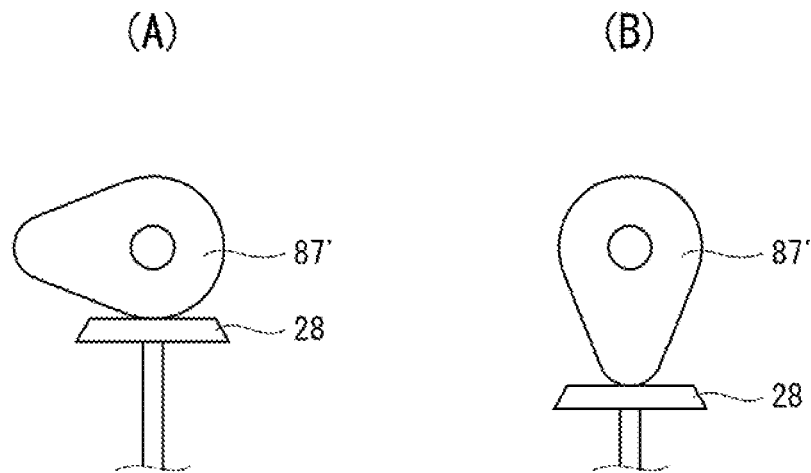
FIGS. 6A and 6B are schematic views each describing a swing part according to the modified example of the present invention.
Figure 7:
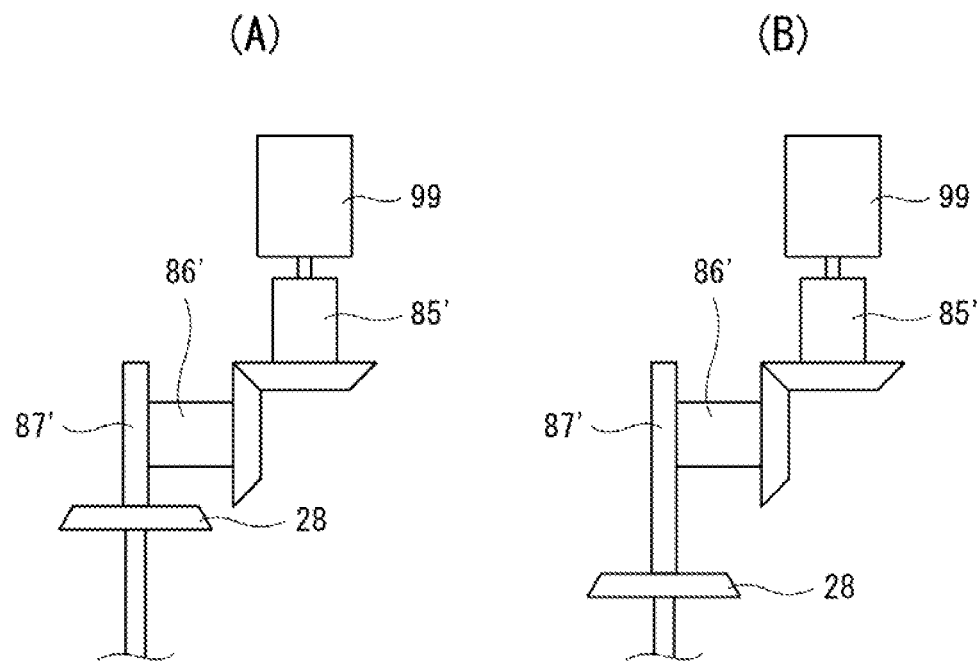
FIGS. 7A and 7B are schematic views each showing the swing part being swung while the swing part is attached to the first and second gears that are bevel gears engaging each other according to the modified example of the present invention.

Alternatively, as shown in FIGS. 6A, 6B, 7A, and 7B, the swing part 87 may be constructed as a cam member. FIGS. 6A and 6B are schematic views each describing a swing part according to the modified example of the present invention in which FIG. 6A is a side view where a press button is not pressed and FIG. 6B is a side view where the press button is being pressed. FIGS. 7A and 7B are schematic views each showing the swing part attached to a first and second bevel gears engaging with each other and being swung, in which FIG. 7A is a side view where the press button is not pressed and FIG. 7B shows a side view where the press button is being pressed. As shown in FIGS. 6A, 6B, 7A, and 7B, a swing part 87' of the modified example may be constructed as a known cam member having an arcuate portion and a triangular portion integrated with the arcuate portion, in a side view.

In the embodiment described above, the end effector 70 holds the eight-channel pipette 18; however, the configuration of the present invention is not limited to this. Namely, the end effector 70 may hold a single-channel pipette (or one pipette 20), or a multi-channel pipette other than the eight-channel pipette (that is a multi-channel pipette having channels between two and seven or a multi-channel pipette having nine or more channels). The robot system 10 may include a number of tips 30 corresponding to a number of channels (i.e., pipettes 20) that a single-channel pipette 20 or a multi-channel pipette includes.

In the embodiment described above, the robot arm 60 includes a six-shaft articulated arm; however, the configuration of the present invention is not limited to this. Specifically, the robot arm 60 may be a multiple articulated arm having at least a single shaft or may be a seven-shaft articulated arm. In addition, the robot arm 60 may include an arm provided with a direct drive shaft.

What is claimed is:

1. An end effector attached to a tip end of a robot arm for providing dispensation using a pipette and a tip attached to the pipette, the pipette including a press button configured to draw a liquid into the tip or to discharge the liquid drawn into the tip from the tip as the press button is pressed and operated;
the end effector comprising:
a holding part for holding the pipette;
a motor;
a swing part that presses and operates the press button as the swing part is driven and swung by the motor; and
a rotating body driven by the motor,
wherein the swing part is connected to the rotating body.

2. The end effector according to claim 1, wherein the rotating body includes:
a first gear attached to a rotation shaft of the motor, and
a second gear engaging with the first gear, and
the swing part is attached to the second gear.

3. The end effector according to claim 2, wherein the swing part is provided with a roller at a location where the swing part contacts the press button.

4. The end effector according to claim 3, wherein the roller is a rubber roller.

5. The end effector according to claim 1, wherein the first gear and the second gear are spur gears that engage with each other.

6. The end effector according to claim 5, wherein the swing part is provided with a roller at a location where the swing part contacts the press button.

7. The end effector according to claim 6, wherein the roller is a rubber roller.

8. The end effector according to claim 1, wherein the first gear and the second gear are bevel gears that engage with each other.

9. The end effector according to claim 8, wherein the swing part is provided with a roller at a location where the swing part contacts the press button.

10. The end effector according to claim 9, wherein the roller is a rubber roller.

11. The end effector according to claim 1, wherein the swing part is provided with a roller at a location where the swing part contacts the press button.

12. The end effector according to claim 11, wherein the roller is a rubber roller.

13. A robot comprising:
a robot arm;
an end effector being attached to a tip end of the robot arm for providing dispensation using a pipette and a tip attached to the pipette; and
a robot controller for controlling the robot arm and the end effector, wherein:
the pipette includes a press button configured to draw a liquid into the tip or to discharge the liquid drawn into the tip from the tip as the press button is pressed and operated; and
the end effector comprises:
a holding part for holding the pipette;
a motor;
a swing part that presses and operates the press button as the swing part is driven and swung by the motor; and
a rotating body driven by the motor, and
the swing part is connected to the rotating body.

14. The robot according to claim 13, wherein the rotating body includes:
a first gear attached to a rotation shaft of the motor-motor, and
a second gear engaging with the first gear, and
the swing part is attached to the second gear.

15. The robot according to claim 14, wherein the swing part is provided with a roller at a location where the swing part contacts the press button.

16. The robot according to claim 13, wherein the first gear and the second gear are spur gears that engage with each other.

17. The robot according to claim 13, wherein the first gear and the second gear are bevel gears that engage with each other.

18. The robot according to claim 13, wherein the swing part is provided with a roller at a location where the swing part contacts the press button.

19. The end effector according to claim 18, wherein the roller is a rubber roller.

20. A robot system comprising:
a pipette;
a liquid and a container for receiving the liquid; and
a robot, wherein:
the robot comprises:
a robot arm,
an end effector being attached to a tip end of the robot arm for providing dispensation using the pipette and a tip attached to the pipette, and
a robot controller for controlling the robot arm and the end effector;
the pipette includes a press button configured to draw a liquid into the tip or to discharge the liquid drawn into the tip from the tip as the press button is pressed and operated; and
the end effector comprises:
a holding part for holding the pipette;
a motor;
a swing part that presses and operates the press button as the swing part is driven and swung by the motor; and
a rotating body driven by the motor; and
the swing part is connected to the rotating body.

\* \* \* \* \*